April 8, 1941.                    E. E. CLINE                    2,237,476
                          APPARATUS FOR FLUID CONTROL
                  Original Filed Sept. 14, 1936     2 Sheets-Sheet 2
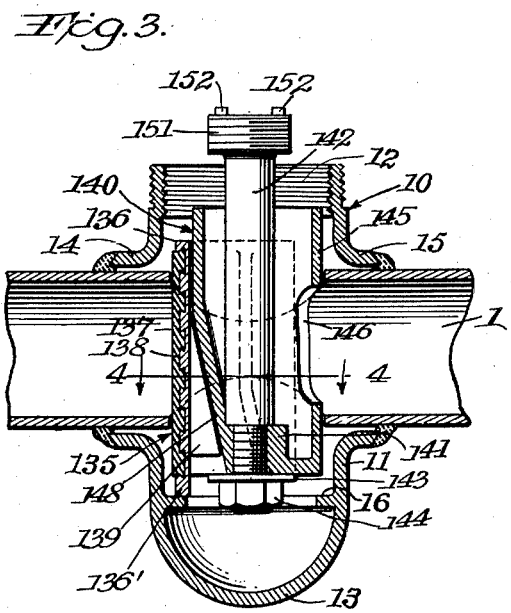
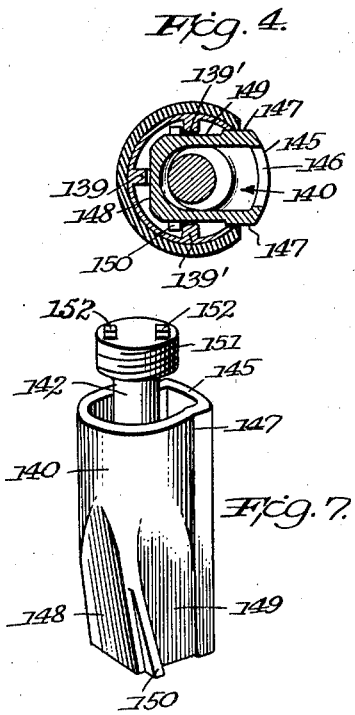
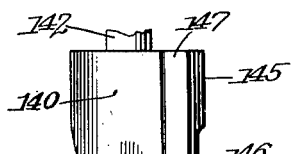
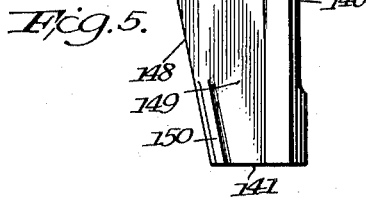
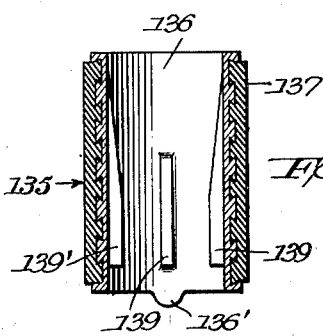
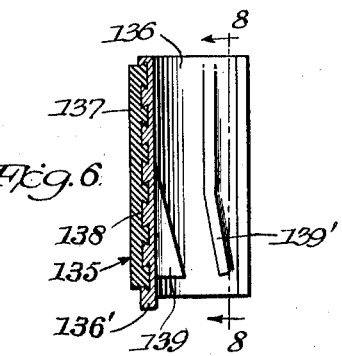
Inventor:
Earl E. Cline
By Cushman, Darby & Cushman
                        Attorneys.

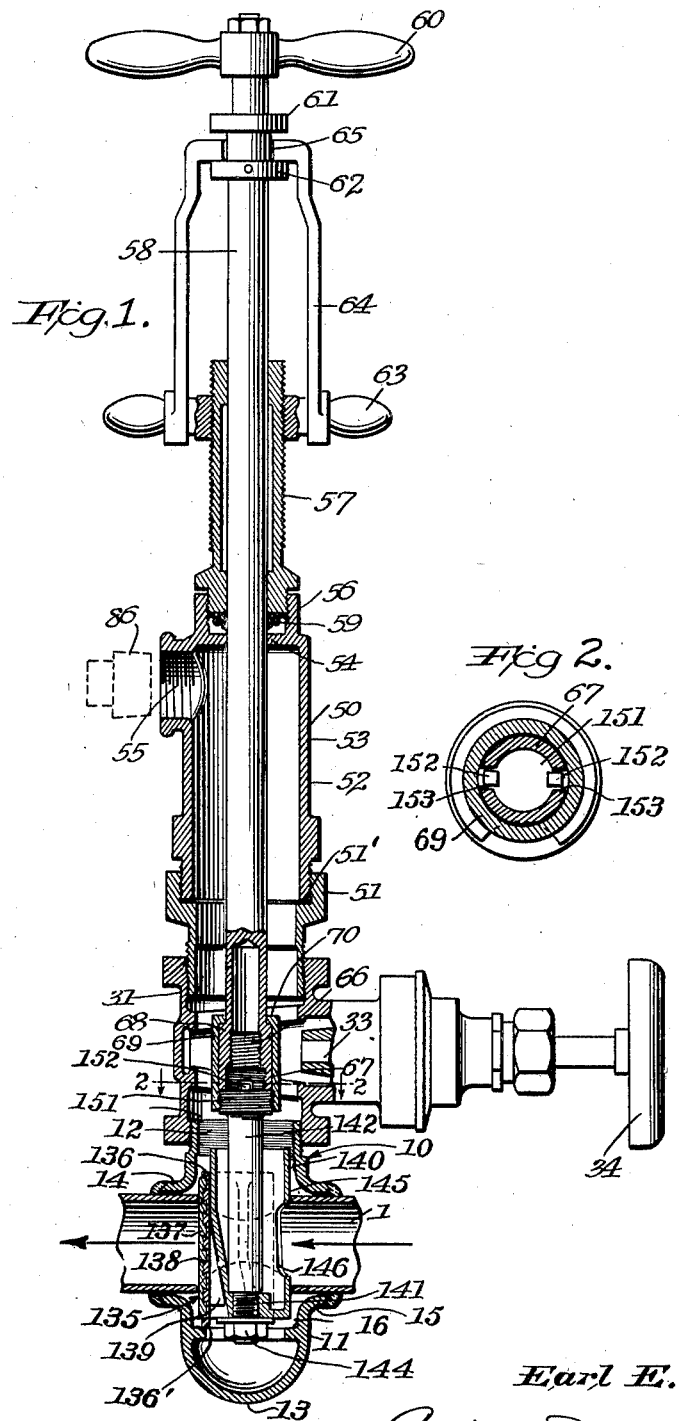

Patented Apr. 8, 1941

2,237,476

UNITED STATES PATENT OFFICE 2,237,476

APPARATUS FOR FLUID CONTROL

Earl E. Cline, Decatur, Ill., assignor to Mueller Co., Decatur, Ill., a corporation of Illinois Application February 27, 1937, Serial No. 128,284, now Patent No. 2,171,939, dated September 5, 1939, which is a division of Serial No. 100,780, September 14, 1936, now Patent No. 2,171,937, dated September 5, 1939. Again divided and this application August 21, 1939, Serial No. 291,233

2 Claims. (Cl. 251—56)

This invention relates to apparatus whereby fluid, under pressure, may be diverted from a fluid conduit and is designed to be used where it is desired to temporarily by-pass or divert the fluid around a section of a conduit which is to be repaired, replaced, or otherwise operated upon.

The present application is a division of a co-pending application of Timothy Allan Larry, Earl E. Cline, and Orville J. Hawkins, Serial No. 128,284, filed Feb. 27, 1937, now Patent 2,171,939, granted Sept. 5, 1939, which is a division of a copending application of Timothy Allan Larry, Earl E. Cline, and Orville J. Hawkins, Serial No. 100,780, filed Sept. 14, 1936, now Patent 2,171,937, granted Sept. 5, 1939.

An object of the present invention is to provide apparatus whereby a section of conduit may be shut off and a by-pass line connected to the apparatus for the purposes and in accordance with the methods more fully described in the above mentioned copending applications.

In general, the object of the invention is to provide apparatus whereby the flow of fluid may be diverted from a pipe line at any desired point and, of course, this apparatus may or may not be used with other apparatus for reintroducing the fluid into the pipe line at another point.

Other objects of the invention will be apparent from the accompanying description and drawings.

Referring to the drawings:

Figure 1 is a view, partly in section, of the apparatus applied to a pipe line.

Figure 2 is a horizontal section taken on the line 2—2 of Figure 1.

Figure 3 is a detailed view, partly in section, of the flow-diverting member.

Figure 4 is a horizontal sectional view taken on the line 4—4 of Figure 3.

Figure 5 is a side view of the wedging device shown in Figures 1 through 3.

Figure 6 is a central vertical section through the expansible shell shown in Figures 1 through 3.

Figure 7 is a perspective view of the wedging device, and

Figure 8 is a sectional view taken on the line 8—8 of Figure 6 showing the expansible shell.

Referring more particularly to the drawings, Figure 1 shows the flow diverting apparatus of this invention applied to a pipe line 1, it being assumed that the pipe line is intended to convey fluid in the direction shown by the arrows.

The apparatus includes a fitting 10 which is preferably constructed and secured to the pipe line in the manner described in the copending application Serial No. 100,780 referred to above.

The fitting consists of a substantially cylindrical portion 11 having an opening 12 at its upper end and closed at its lower end 13. The upper end is preferably threaded exteriorly and interiorly for the attachment of other apparatus. The fitting is provided with aligned lateral openings, which are bounded by the laterally extending hubs 14 and 15 and which are adapted to receive the pipe 1. The lower cylindrical portion of the fitting is provided interiorly with a circumferential projection or abutment 16 which is adapted to limit the inward or downward movement of the valve member which, as will be described, is inserted through the open end of the fitting.

After the fitting has been welded to the pipe at the point from which it is desired to divert the flow of the fluid, a valve body 31 having a tapered valve seat 32 and provided with a valve, preferably a gate valve 33, operable by handle 34, is threaded on the upper end of the fitting.

An enclosed drilling apparatus is then secured to the upper end of the valve body and, after the gate valve 33 has been withdrawn, the portion of the top and bottom wall of the pipe which is within the fitting 10 may be cut away without loss of fluid or fluid pressure. This drilling operation is more fully described in the copending application Serial No. 100,780, referred to above.

When the drilling is completed, the gate valve 33 is closed and the drilling apparatus removed after which the flow-diverting apparatus may be secured to the upper end of the valve body 31. This apparatus includes an adapter 51, externally screw threaded at its lower end for attachment to the upper end of the valve body 31 and it is preferably provided at its upper end with internal screw threads for the attachment of the flow-diverting chamber 52.

The flow-diverting chamber 52 is preferably substantially cylindrical and its lower end, which is open, is externally screw threaded for engagement with the internal screw threads at the upper end of the adapter 51. An annular gasket 51' is inserted between the flow-diverting chamber and the adapter to provide a fluid tight joint. The chamber 52 comprises the substantially cylindrical side wall 53 and a centrally apertured top wall 54. The side wall 53 is provided with an internally threaded opening 55 to which a pipe may be connected if it is desired to continue the conduit formed by the valve body 31, adapter 51 and chamber 52, leading from the upper end of the fitting. The side wall of the chamber 52 extends above the top wall 54 and the extension 56 is provided with internal threads for the attachment of a feed sleeve 57.

A bar 58 is slidably and rotatably mounted within the feed sleeve 57 and within the centrally apertured top wall 54 of the flow-diverting chamber, a tight joint being maintained around the lower end of the feed sleeve, by means of a conventional packing 59 located between the feed sleeve 57 and the upper wall 54 of the chamber 52.

The bar 58 is provided at its upper end with an operating handle 60. Spaced collars 61 and 62 are fixed on the upper portion of the bar 58 and in order that the bar 58 may be forced upwardly or downwardly, a feed screw 63 is threaded on the feed sleeve 57 and may be connected with the bar 58 by means of a yoke 64 pivoted upon the feed screw 63 and having its head portion slotted as at 65 so that it may be swung into engagement with the bar 58 between the collars 61 and 62, as shown in Figure 1.

The lower end of the bar 58 is provided with a socket 66 which may be provided with left-handed internal threads, and a lower counter-bored socket 67 which may be internally threaded with right-handed threads. The lower end of the bar 58 is slightly enlarged to provide a shoulder 68 for the retention of a sleeve 69, the upper end of which is internally flanged at 70. The sleeve 69, which is adapted to be slipped on over the top of the bar 58, during the assembly thereof and before the handle 60 and collars 61 and 62 are attached, extends below the lower extremity of the bar 58 and is provided at its lower end with internal screw threads for the attachment of the flow-diverting valve generally designated at 135.

The flow-diverting valve 135 consists of a metallic shell 136 which is adapted to be positioned within the opening, established in the pipe line 1, and is curved to conform to the shape of the opening. The metallic shell 136 is preferably provided on its outer surface with a layer of rubber 137 secured thereto in any suitable manner, as for example by dove-tail joints 138. The shell 136 is open at the top and bottom and along one side and may be positioned within the opening established in the pipe with the shell closing off one section of the pipe and the opening in the side of the shell so disposed with relation to the other section of the pipe as to permit fluid to pass interiorly of the shell and upwardly through the open end of the fitting 10.

In order that the shell 136 may be expanded into sealing engagement with the walls of the pipe 1, a plurality of wedge-shaped members 139, 139' are provided on the interior, merging with the upper interior surface of the shell and extending downwardly and away from the interior surface. A hollow wedging device 140 is adapted to be moved downwardly to slidably engage the wedge members 139, 139' on the interior surface of the shell and also engage the section of the pipe opposite to that which is to be closed off. The shell 136 may be provided at its lower end with an integral projection 136' which is adapted to rest on the abutment 16 of the fitting 10 to limit the downward movement of the shell although it will be understood that the projection 136' may be omitted, in which case the lower edge of the shell will rest on the abutment 16.

The wedging device 140 includes a base 141 having an internally threaded vertical bore into which a rod 142, having a threaded lower end, may be screwed. The threaded lower end of the rod 142 extends through and beyond the base 141 for a sufficient distance to enable a washer 143 and nut 144 to be secured thereon. After threading the rod 142 through the base 141, it is preferably secured against rotation therein by a pin (not shown) extending through the base and the rod. A wall 145 extends vertically upward from the base 141, and forms one side of the hollow wedging device 140. The wall 145 is somewhat curved in cross section (Figure 4) to conform to the shape of the opening in the pipe 1 and is provided intermediate its top and bottom with an aperture 146 through which fluid may flow into the hollow wedging device when the wall 145 is positioned, as shown in Figure 1, with the aperture 146, facing toward the pressure side of the main 1. Substantially flat and parallel walls 147 extend inwardly from wall 145 for a relatively short distance and fit loosely within the side opening of the shell 136, the vertical edges of the shell 136 thus guiding the vertical movement of the wedging device 140.

At the upper end of the wedging device 140, the side walls 147 bend outwardly and then inwardly and circularly to meet and form the upper portion of the hollow wedging device. The curvature of the upper portion of the hollow wedging device conforms substantially to the curvature of the interior surface of the shell 136, the latter enveloping the former, whereby the upper end of the shell is slidably retained by the upper end of the wedging device.

The side of the wedging device 140, which is opposite the wall 145, and which is curved at its upper end to substantially conform to the curvature of the interior surface of the valve member 136, is flattened at a point preferably approximately one-quarter of the distance down its side, and the flattened portion, shown at 148, inclines downwardly and inwardly to the lower edge of the base 141 and substantially to the rod 142.

The portions 149 of the wedging device 140, which extend between the parallel walls 147 and the side opposite the wall 145, are similarly flattened and are inclined downwardly and inwardly toward the lower edge of the base 141.

The portions 149 are provided with ribs 150, which extend from the lower edge of the base 141, parallel to the edge of the flattened and tapering portion 158, for a distance preferably approximately one-third of the length of the wedging device 140.

When the device is assembled, the ribs 150 are positioned adjacent to and inwardly of the wedge members 139' and the lower end of the wedging device will thus slidably retain the shell 136. It is to be noted that the wedge members 139' are inclined at their lower ends to conform substantially with the inclination of the ribs 150, in order to permit the shell to move away from the wedging device.

The upper end of the rod 142 is provided with an enlarged threaded head 151 having lugs 152 on its upper surface and the flow-diverting valve may be connected to the bar 58 of the apparatus shown in Figure 1 by threading the sleeve 67 over the head 151.

The object of the procedure now to be described is to prevent the flow of fluid into the section of the pipe 1 shown on the left hand side of the flow-diverting valve 135 (Figure 1) while causing the fluid to flow out of the pipe 1 through the open end of the fitting and through the conduit formed by the valve body 31, the adapter 51, the chamber 52 and its outlet 55.

By turning the handle 60, the valve 135 is rotated until its opening 146 is aligned with the axis of the pipe 1 and faces upstream. It will be seen that rotation of the flow-diverting valve relative to the bar 58 is prevented by the engagement of the lugs 152 in the slots 153 which are provided in the lower extremity of the bar 58. The bar 58 is then moved downwardly, by pushing down on the handle 60, until the valve 135 is in the position shown in Figure 1, the downward movement being arrested when the projection 139' contacts the inwardly projecting abutment 16 of the fitting 10.

It will be understood that suitable symbols may be placed on the handle 60 to indicate the direction in which the aperture faces.

The yoke 64 is now swung to upright position engaging the bar 58 between the collars 61 and 62, as shown in Figure 1, and the feed screw 63 is turned to the right to apply downward pressure, through the collar 62 and bar 58, to the wedging device 140.

It will be seen that when the wedging device 140 moves downwardly, a wedging action takes place between the wedge member 139 and the inclined walls 148 and between the wedge members 139' and the inclined walls 149. Since downward movement of the shell 136 is prevented by the abutment 16, the shell 136 is expanded into sealing engagement with the adjacent pipe walls, and the vertical wall 145 of the wedging device is forced against the section of the pipe on the pressure side of the fitting. Flow of fluid into the section of the pipe immediately below the flow-diverting valve is thus prevented and a tight seal effected, while the fluid from the upper or pressure section of the main will flow through the aperture 146 and upward through the open end of the wedging device 140 and the open end of the fitting 10.

When it is desired to restore flow through the pipe 1, the yoke 64 may be disengaged from the bar 58 and the valve 145 may be drawn up into the chamber 52 by pulling up on the handle 60. The gate valve 33 may then be operated to closed position and the flow-diverting apparatus, including the adapter 51, may be removed without substantial loss of fluid.

If the valve body 31 is also to be removed, this may be done without substantial loss of fluid by threading a closure plug into the upper end of the fitting 10, in the manner described in the copending application Serial No. 100,780 referred to above.

During assembly or disassembly of the apparatus, it is usually desirable to prevent flow of fluid from the chamber 52 and for this purpose a plug 86, shown diagrammatically in Figure 1, may be threaded into the opening 55.

It will be apparent that the above described apparatus and procedure may be modified without departing from the scope of the invention, and it is intended that all matter contained in the above description or shown in the accompanying drawings be regarded as merely illustrative.

I claim:

1. In an apparatus adapted to be attached to a pipe for temporarily diverting the flow of fluid therefrom, a fitting having a substantially cylindrical portion open at its upper end and closed at its lower end, the cylindrical portion having aligned lateral openings therein through which the pipe extends, an expansible substantially cylindrical valve member having a central passageway therein and adapted to be inserted within the fitting, a portion of at least the top and bottom wall of the pipe within the cylindrical portion of the fitting being cut away so that the valve member may be inserted within the pipe, means adapted to limit the downward movement of the valve member, said valve member having an opening in its side communicating, through said central passageway, with an opening in the upper end of the valve member, a conduit secured to the upper end of the fitting for conducting fluid therefrom, wedging means capable of limited vertical movement within the valve member and secured against rotation with respect thereto, said wedging means being located at least partially within but not obstructing said central passageway and being adapted to expand the valve member when moved downwardly therein, and a shaft, one end of which is fixed to said wedging means, said shaft being rotatable so that the valve member may be turned to a position in which the opening therein faces upstream, said shaft also being movable axially so that the valve member may be expanded into sealing engagement with the walls of the pipe, when urged against said means, to prevent flow of fluid from the upstream side of the fitting to that portion of the pipe which is connected to the other side of the fitting and to permit flow of fluid through the valve member into the conduit secured to the upper end of the fitting, when the valve member is positioned with the opening in the side thereof facing upstream.

2. In an apparatus adapted to be attached to a pipe for shutting off the flow of fluid therein, a fitting having a substantially cylindrical portion open at its upper end and closed at its lower end, the cylindrical portion having aligned lateral openings therein through which the pipe extends, a portion of at least the top and bottom wall of the pipe within the cylindrical portion of the fitting being cut away to form an opening in the pipe into which a valve member may be inserted, means adapted to limit the downward movement of the valve member, said valve member consisting of an expansible shell curved to substantially conform to the shape of the opening, the shell being open at the top and bottom and along one side, and having on its interior surface a plurality of inclined surfaces, wedging means positioned within the shell and capable of limited vertical movement therein, said wedging means having a portion along one side thereof which extends through the opening along one side of the expansible shell, said portion being adapted to abut against one side of the opening in the pipe whereby the expansible shell is forced into sealing engagement with the other side of the opening in the pipe when the wedging means is forced downwardly in wedging relationship with the inclined surfaces on the interior of the shell.

EARL E. CLINE.